No. 823,651. PATENTED JUNE 19, 1906.
W. H. VOSS.
MECHANICAL MOVEMENT.
APPLICATION FILED JAN. 15, 1906.

2 SHEETS—SHEET 1.

Witnesses:

Inventor:
William H. Voss.
By Frank D. Thomason
atty

No. 823,651. PATENTED JUNE 19, 1906.
W. H. VOSS.
MECHANICAL MOVEMENT.
APPLICATION FILED JAN. 15, 1906.
2 SHEETS—SHEET 2.
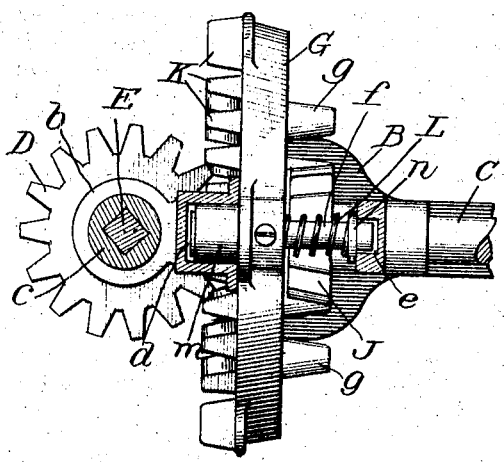
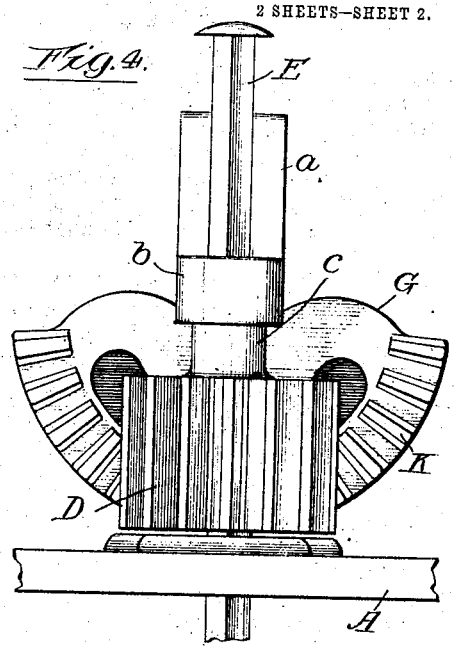
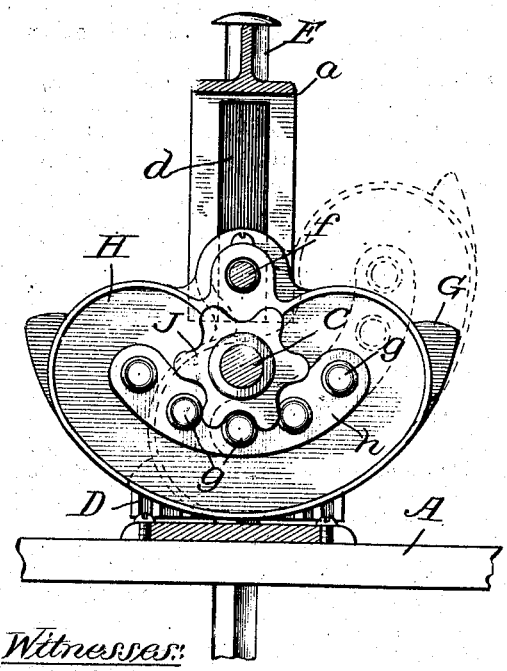
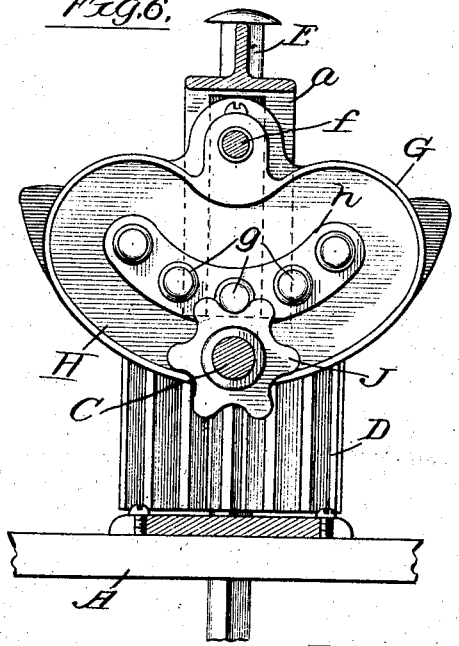
Witnesses:
Inventor:
William H. Voss

UNITED STATES PATENT OFFICE.

WILLIAM H. VOSS, OF DAVENPORT, IOWA.

MECHANICAL MOVEMENT.

No. 823,651.        Specification of Letters Patent.        Patented June 19, 1906.

Application filed January 15, 1906. Serial No. 296,150.

*To all whom it may concern:*

Be it known that I, WILLIAM H. VOSS, a citizen of the United States, and a resident of Davenport, in the county of Scott and State of Iowa, have invented a certain new and useful Improved Mechanical Movement, of which the following is a clear, full, and exact description.

My invention relates to a mechanical movement for converting a continuously-revolving movement into a rotary reciprocal movement, and it is particularly adapted for use in the operation of what is known to the trade as "rotary washing-machines."

The object of my invention is to produce an economically-constructed machine which is capable of transmitting increased power to the rotary reciprocal shaft of the mechanism and which will avoid the sudden jerk usually produced in mechanisms of this class at the moment of reversal of the movement. This I accomplish by the means hereinafter fully described, and as particularly pointed out in the claims.

Figure 1:
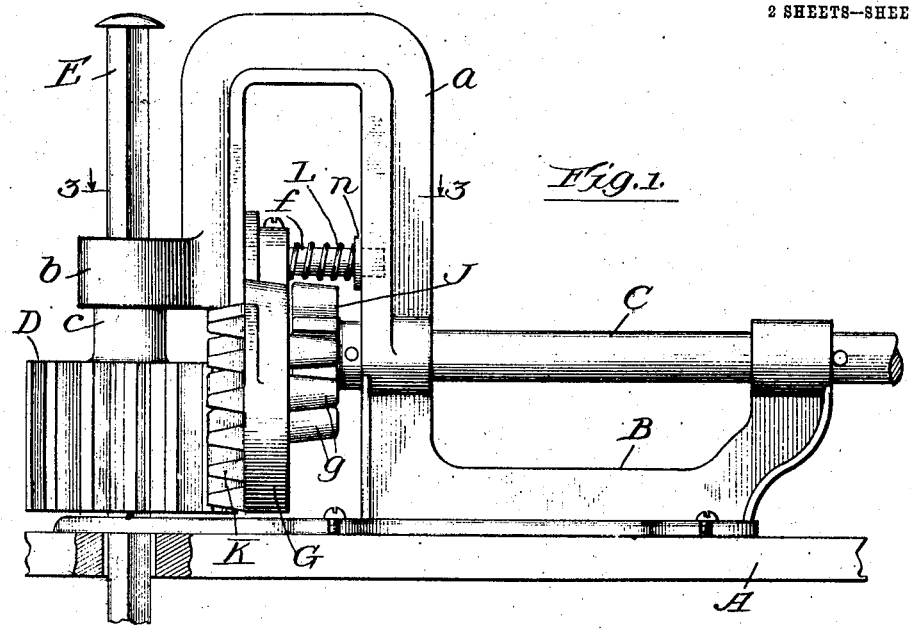
Figure 2:
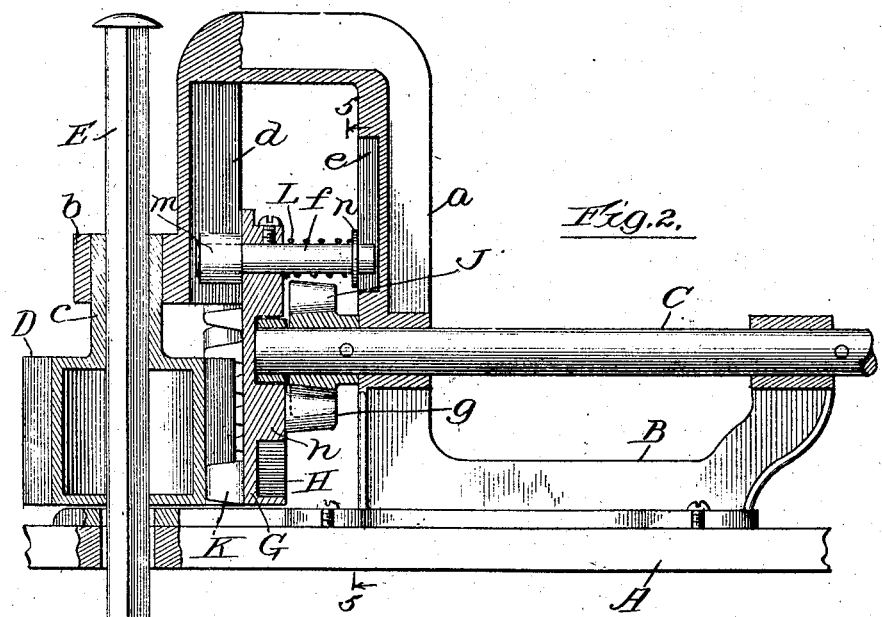

In the drawings, Figure 1 is a side elevation of my invention, showing portions of the shafts and the support thereof broken away. Fig. 2 is a longitudinal vertical section thereof. Fig. 3 is a horizontal section of the end of the machine at which the converting mechanism is located, taken on dotted line 3 3, Fig. 1. Fig. 4 is an end elevation of my invention. Fig. 5 is a vertical transverse section taken on dotted line 5 5, Fig. 2, showing the converting mechanism of the machine in one position; and Fig. 6 is a similar view showing said converting mechanism in a position opposite to that shown in Fig. 5.

Referring to the drawings, A represents the cover of a washtub or other suitable support for my improved mechanism, and B represents the stationary frame having bearings in which a continuously-revolving drive-shaft is suitably journaled. At the end nearest the converting-gear of the machine this frame B has a gooseneck extension *a* projecting from the adjacent bearings of the drive-shaft, which is of an inverted-U shape, and has its unsupported extremity projecting horizontally and provided with suitable bearings *b* for the upper extended boss *c* of the vertically-elongated gear, up through the center of which latter the squared rotary reciprocal shaft E extends and is capable of a longitudinal sliding movement.

The inner or opposing faces of the parallel vertical branches of the extension *a* are provided with vertical guide-grooves *d e*, and these grooves are designed to receive the ends of a pivotal shaft *f*. Secured near one end of shaft *f* is a pendent segmental plate G, which is provided with a segmentally-arranged series of studs *g*, the centers of which are intersected by an imaginary curved line struck from the center of the shaft *f*. These studs project toward the frame B from a segmental raised portion *h* of the plate and the latter is inclosed by a segmental flange which is removed a suitable distance therefrom so as to provide a runway H.

The studs *g* form a pendulous rack which is engaged by a suitable spur-wheel J on the adjacent extended end of drive-shaft C, whose extremity enters runway H and holds the studs in engagement with spur-wheel J. Projecting from the side of the pendent plate G opposite studs *g* is a segmental gear K, which is struck from the center of shaft *f* and is preferably of a greater radius than said studs, and this segmental gear engages a longitudinally-elongated gear D on the rotary reciprocal shaft E.

The operation of my invention is substantially as follows: As the shaft C revolves continuously in one direction the engagement of the spur-wheel J with the studs *g* causes plate G to move from the position thereof shown in Fig. 5, in which said spur-wheel engages the upper sides of said studs into the position shown in dotted lines in said Fig. 5, whereupon the spur-wheel raises the plate until the under side of said studs are engaged, thus causing the plate G to move in the opposite direction above the spur-wheel, as shown in Fig. 6 of the drawings, until the opposite ends of the studs are engaged. The engagement by the spur-wheel of this last-mentioned end of the series of studs causes the plate to swing as far to the left as it did to the right and to move downward by reason of the combined weight thereof and the action of the spur-wheel until the latter engages the under side of the series of studs, whereupon the plate will again move in the direction first indicated. As the plate G thus swings first to one side and then the other, the segmental gear K through the elongated gear D imparts a rotary reciprocal motion to the vertical shaft E.

If desired, the ends of shaft *f*, moving in the guide-grooves *d e*, may be provided with antifriction-rollers. I prefer, however, to provide only that end of shaft $f$ moving in the guide-groove $d$ with an antifriction-roller $m$, and to provide the opposite end thereof with a loose washer $n$, whose diameter is greater than the guide-groove $e$, and to surround said shaft between the washer $n$ and plate G with a coil expansion-spring L. This has a tendency to keep the plate G bearing against the unsupported branch of the extension $a$ of frame B and prevents the rattling of the parts which otherwise might ensue. I do not wish to be confined, however, to the exact construction of the mechanism shown for accomplishing this result, as other mechanism might be substituted therefor or it might be omitted altogether.

What I claim as new is—

1. A mechanical movement comprising a continuously-revolving shaft; a pendulous rack the pivotal means of which has a movement at right angles to said continuously-revolving shaft, and a rotary reciprocal shaft operatively connected to and actuated by said rack.

2. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion, and a rotary reciprocal shaft operatively connected to and actuated by said rack.

3. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion and having an endless runway surrounding said studs into which the extended end of said continuously-revolving shaft enters, and a rotary reciprocal shaft operatively connected to and actuated by said rack.

4. A mechanical movement comprising a continuously-revolving shaft, a pinion on the end thereof, a pendulous rack the pivots of which have a reciprocal movement at right angles to said shaft, and which consists of a plate having a segmentally-arranged series of studs projecting therefrom that are engaged by said pinion, and a rotary reciprocal shaft operatively connected to and actuated by said rack.

5. A mechanical movement comprising a continuously-revolving shaft, a pinion on the end thereof, a pendulous rack the pivots of which have a reciprocal movement at right angles to said shaft, and which consists of a plate having a segmentally-arranged series of studs projecting therefrom that are engaged by said pinion and having an endless runway surrounding said studs into which the extended end of said continuously-revolving shaft enters, and a rotary reciprocal shaft operatively connected to and actuated by said rack.

6. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion and having a segmental gear projecting from the side thereof opposite said studs, a rotary reciprocal shaft, and a pinion on said shaft engaged by said segmental gear.

7. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion and having an endless runway surrounding said studs into which the extended end of said continuously-revolving shaft enters, and also having a segmental gear projecting from the side thereof opposite said studs, a rotary reciprocal shaft, and a pinion on said shaft engaged by said segmental gear.

8. A mechanical movement comprising a continuously-revolving shaft, a pinion on the end thereof, a pendulous rack the pivots of which have a reciprocal movement at right angles to said shaft, and which consists of a plate having a segmentally-arranged series of studs projecting therefrom that are engaged by said pinion and having a segmental gear projecting from the side thereof opposite said studs, a rotary reciprocal shaft, and a pinion on said shaft engaged by said segmental gear.

9. A mechanical movement comprising a continuously-revolving shaft, a pinion on the end thereof, a pendulous rack the pivots of which have a reciprocal movement at right angles to said shaft, and which consists of a plate having a segmentally-arranged series of studs projecting therefrom that are engaged by said pinion and having an endless runway surrounding said studs into which the extended end of said continuously-revolving shaft enters, and also having a segmental gear projecting from the side thereof opposite said studs, a rotary reciprocal shaft, and a pinion on said shaft engaged by said segmental gear.

10. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion and having a segmental gear projecting from the side thereof opposite said studs, a rotary reciprocal shaft, and an elongated pinion on said shaft engaged by said segmental gear.

11. A mechanical movement comprising a continuously-revolving shaft, a pinion on the end thereof, a pendulous rack the horizontal axis of which moves up and down in addition to its rotary reciprocal movement consisting of a plate having a segmentally-arranged series of studs projecting therefrom that are engaged by said pinion and having an endless runway surrounding said studs into which the extended end of said continuously-revolving shaft enters, and also having a segmental gear projecting from the side thereof opposite said studs, a rotary reciprocal shaft, and an elongated pinion on said shaft engaged by said segmental gear.

12. A mechanical movement comprising a continuously-revolving shaft, a pendulous rack engaged thereby, spring-actuated means for muffling the rattle of said rack, and a rotary reciprocal shaft operatively connected to and actuated by said rack.

13. A mechanical movement comprising a continuously-revolving shaft, a pinion on the end thereof, a pendulous rack consisting of a plate having a segmentally-arranged series of studs projecting therefrom that are engaged by said pinion, a shaft on which said plate is pivoted having a reciprocal movement at right angles to said shaft, means thereon for muffling the rattle of said shaft and rack, and a rotary reciprocal shaft operatively connected to and actuated by said rack.

14. A mechanical movement comprising a continuously-revolving shaft, a suitable frame in which said shaft is journaled, which has an inverted-U-shaped extension projecting from one end thereof, the opposing faces of the parallel branches of which have longitudinal guide-grooves therein, a pendulous rack, a shaft on which said rack is pivoted having its ends extended into said guide-grooves and reciprocal therein at right angles to said continuously-revolving shaft, and a rotary reciprocal shaft operatively connected to and actuated by said rack.

15. A mechanical movement comprising a continuously-revolving shaft, a suitable frame in which said shaft is journaled, which has an inverted-U-shaped extension projecting from one end thereof, the opposing faces of the parallel branches of which have longitudinal guide-grooves therein, a pendulous rack consisting of a plate having a segmentally-arranged series of studs projecting therefrom which are engaged by said continuously-revolving shaft, a shaft on which said plate is pivoted having its ends extended into said guide-grooves and reciprocal therein at right angles to said continuously-revolving shaft, and a rotary reciprocal shaft operatively connected to and actuated by said rack.

16. A mechanical movement comprising a continuously-revolving shaft, a suitable frame in which said shaft is journaled, which has an inverted-U-shaped extension projecting from one end thereof, the opposing faces of the parallel branches of which have longitudinal guide-grooves therein, a pendulous rack, a shaft on which said rack is pivoted having its ends extend into said guide-grooves and reciprocal therein at right angles to said continuously-revolving shaft, a coil expansion-spring surrounding said shaft between said rack and the end thereof farthest from the rack and a rotary reciprocal shaft operatively connected to and actuated by said rack.

17. A mechanical movement comprising a continuously-revolving shaft, a suitable frame in which said shaft is journaled, which has an inverted-U-shaped extension projecting from one end thereof, the opposing faces of the parallel branches of which have longitudinal guide-grooves therein, a pendulous rack consisting of a plate having a segmentally-arranged series of studs projecting therefrom which are engaged by said continuously-revolving shaft, a shaft on which said plate is pivoted having its ends extend into said guide-grooves and reciprocal therein at right angles to said continuously-revolving shaft, a coil expansion-spring surrounding said shaft between said rack and the end thereof farthest from the rack and a rotary reciprocal shaft operatively connected to and actuated by said rack.

In testimony whereof I have hereunto set my hand this 22d day of December, 1905.

WILLIAM H. VOSS.

Witnesses:
WILLIAM E. PULS,
ARTHUR CLIFFORD,
FRANK D. THOMASON.